UNITED STATES PATENT OFFICE.

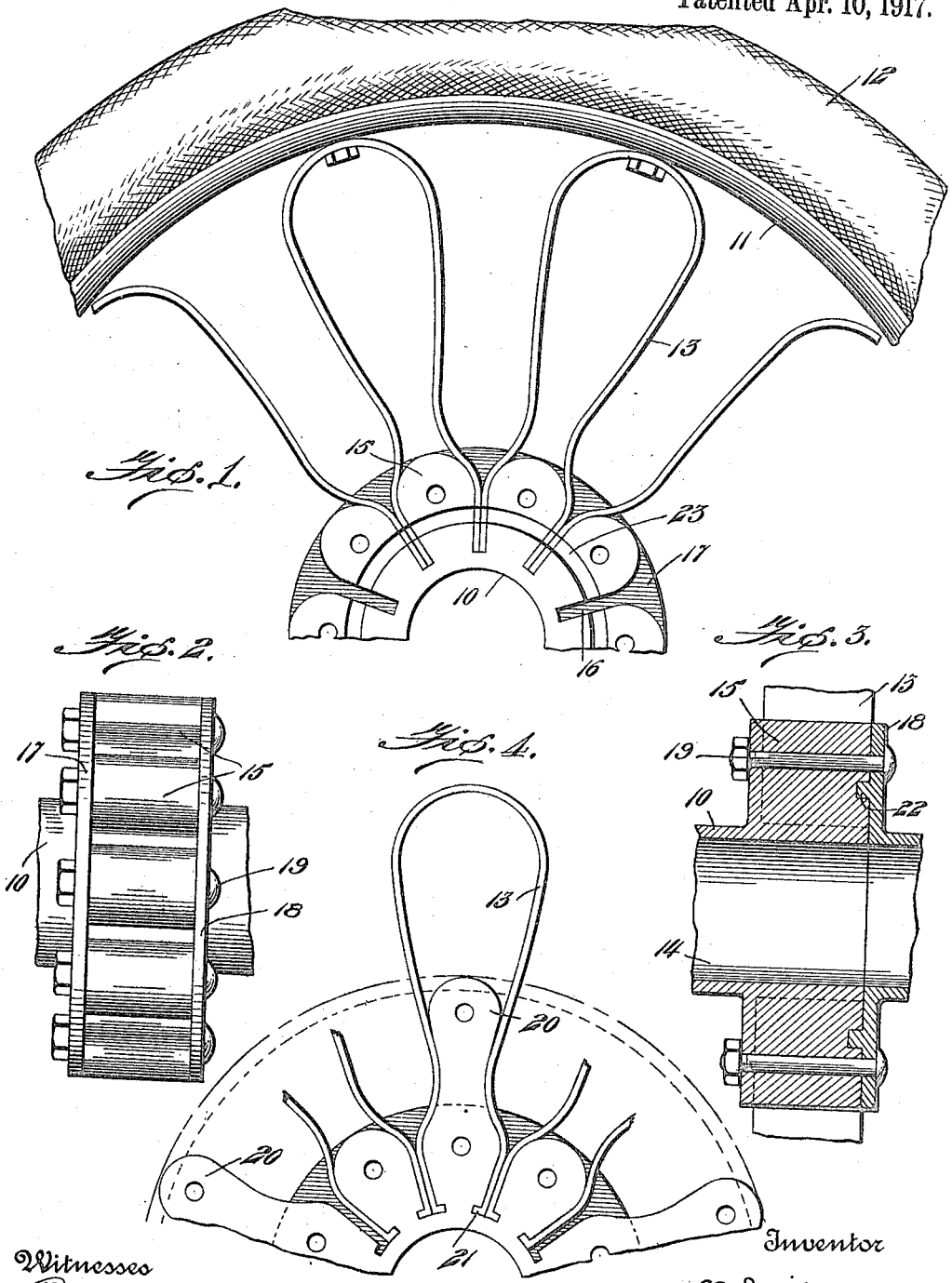

AUGUSTA V. MITCHELL, OF WASHINGTON, DISTRICT OF COLUMBIA.

WHEEL-HUB.

1,222,231.  Specification of Letters Patent.  Patented Apr. 10, 1917.

Application filed June 20, 1913. Serial No. 774,888.

*To all whom it may concern:*

Be it known that I, AUGUSTA V. MITCHELL, a citizen of the United States, and resident of Washington, District of Columbia, have invented certain new and useful Improvements in Wheel-Hubs, of which the following is a specification.

This invention relates to wheel hubs and has particular reference to the hubs used in automobile wheels employing spring spokes of a novel kind. The purpose of the invention is to simplify and cheapen the construction of the hubs and at the same time to secure greater strength and durability. The novel features will be apparent from the following description taken in connection with the drawings.

In the drawings,

Figure 1 is a side elevation partly broken away of a wheel having my invention applied thereto;

Fig. 2 is an edge view of the hub alone;

Fig. 3 is a vertical section through the hub;

Fig. 4 is a view like Fig. 1 showing a modified construction as used on the wheel embodying the brake drum.

In the drawings, 10 represents the body portion of the hub, 11 represents the rim of an automobile wheel on which is secured the tire 12 and 13 represents the spring spokes.

The body member 10 has the usual bearing opening 14 which may be made of any suitable shape or construction to suit the particular use and the body member has on it a circular radial flange 15 which as shown has considerable thickness. This flange 15 has grooves 16 formed in one face and radiating from the center and they extend through the major portion of the flange to a point near the opposite face thereof. A uniform thickness of material is left at the end of each slot thus leaving what may be termed an integral plate closing the ends of the slots on one side of the device. These grooves are of substantially uniform depth and are of such width in the preferred construction shown to receive the ends of two flat spring spokes. The outer ends of the grooves are enlarged as at 17 by outward curves to the material forming the groove so that the form of spring spoke shown may curve outward away from the adjacent spoke within the margin of the circular flange 15. It will be observed that by this construction the body member has radial projections around its circumference leaving grooves with parallel sides to receive the spokes and that the outer ends of the projections are rounded on a curve in the plane of the wheel.

As will be seen by reference to the drawings, the spokes have ends which are flat and radial and the two ends of each spoke enter two adjacent slots and the spoke can be placed in position by sliding it in from the open end of the slots. A plate 18 extends radially around the body member and is secured to the face of the flange 15 over the open ends of the slots, thus holding and securing the spring spokes in place. The spokes themselves preferably have a width equal to the depth of the grooves and therefore fit snugly in them. The radial plate 18 is secured in place by any suitable means and in the form shown I have illustrated bolts 19 for that purpose passing through the flange 15.

The construction shown in Fig. 4 is similar to that above described but in order to provide means for securing in place the brake drum I have shown the material between the adjacent slots at intervals around the circumference extended outward beyond the edge of the flange 15, the extension being marked 20. The brake drum may be bolted directly to these extensions thus furnishing a solid and durable fastening means. In this particular form I have also shown the inner ends of the spring spokes 13 bent at an angle at 21 fitting in a corresponding groove transversely at the inner edge of the radial grooves 16. These inward bends serve to lock the spokes in position but I have found that such locking means is not always necessary since the spokes will be sufficiently locked by the radial arrangement of the ends.

When positive means are to be used for locking the spokes against end movement in the grooves 16 as may be advisable in some cases I prefer to use for the purpose the means shown in Figs. 1 and 3. That means consists in a small circular rib 22 formed on the inner face of the plate 18 entering a groove 23 in the face of the flange 15 crossing the grooves 16. The inner radial ends of the spokes have notches in their edges corresponding to and forming a continuation of the groove 23 when the spokes are in place so that the rib 22 entering the notches will lock the spokes against end movement.

Since the body member and radial flange are made from a single piece of material the wheel hub will have great strength and durability, and owing to the construction described it is very easy to secure the spokes in place on the hub and a single spoke may be removed by removing the end retaining plate without disturbing the other spokes. The wheel hub is preferably made of metal, but it will be understood that the invention is not limited to the particular material.

Having described my invention what I claim and desire to secure by Letters-Patent is, In a wheel hub, the combination with a body member having radial projections thereon at regular intervals separated to form slots between them having straight parallel sides, the slots being closed at one end, the outer ends of the projections being rounded on a curve in the plane of the wheel, of a removable plate closing the other end of said slots and spring spokes having straight ends and being bent to lie slightly over and against the outer curved ends of said projections.

In testimony whereof I affix my signature in presence of two witnesses.

AUGUSTA V. MITCHELL.

Witnesses:
ARTHUR L. BRYANT,
JOHN M. COIT.

Copies of this patent may be obtained for five cents each, by addressing the "Commissioner of Patents, Washington, D. C."